United States Patent [19]

Marcou et al.

[11] Patent Number: 5,524,284
[45] Date of Patent: Jun. 4, 1996

[54] ANTENNA ADAPTER FOR PORTABLE CELLULAR TELEPHONE

[75] Inventors: Tony L. Marcou, Cary; Ron Langenberg, Arlington Heights, both of Ill.; Bradley S. Haussler; Jon L. Sullivan, both of Lincoln, Nebr.

[73] Assignee: The Antenna Company, Itasca, Ill.

[21] Appl. No.: 283,228

[22] Filed: Jul. 29, 1994

[51] Int. Cl.⁶ .............................. H01Q 1/24; H04B 1/38
[52] U.S. Cl. .................... 455/90; 455/129; 455/280; 455/349; 343/702; 439/916
[58] Field of Search .................... 455/89, 90, 129, 455/269, 280, 281, 347, 348, 349, 351, 80, 82, 83; 343/702, 906; 439/916

[56] References Cited

U.S. PATENT DOCUMENTS

| 4,636,015 | 1/1987 | Ford, Jr. |
| 4,718,110 | 1/1988 | Schaefer. |
| 4,761,823 | 8/1988 | Fier. |
| 4,840,574 | 6/1989 | Mills. |
| 4,867,698 | 9/1989 | Griffiths. |
| 5,170,173 | 12/1992 | Krenz et al. |
| 5,211,581 | 5/1993 | Schwartz et al. |
| 5,278,570 | 1/1994 | Jaramillo et al. |

*Primary Examiner*—Chi H. Pham
*Attorney, Agent, or Firm*—Angelo J. Bufalino; Thomas D. Paulius

[57] ABSTRACT

An adapter assembly for adapting a portable cellular telephone to receive an external replacement antenna or an external direct feed connection includes an adapter element and a retention element. The adapter element includes an antenna receiving bore at one end, and a positioning member at the other end, and further includes a latching member operable between first and second operative positions. The retention element includes a base cap with an extending actuator that biases the latching member into the second operative position where the adapter element is in engagement with body of the telephone.

29 Claims, 4 Drawing Sheets

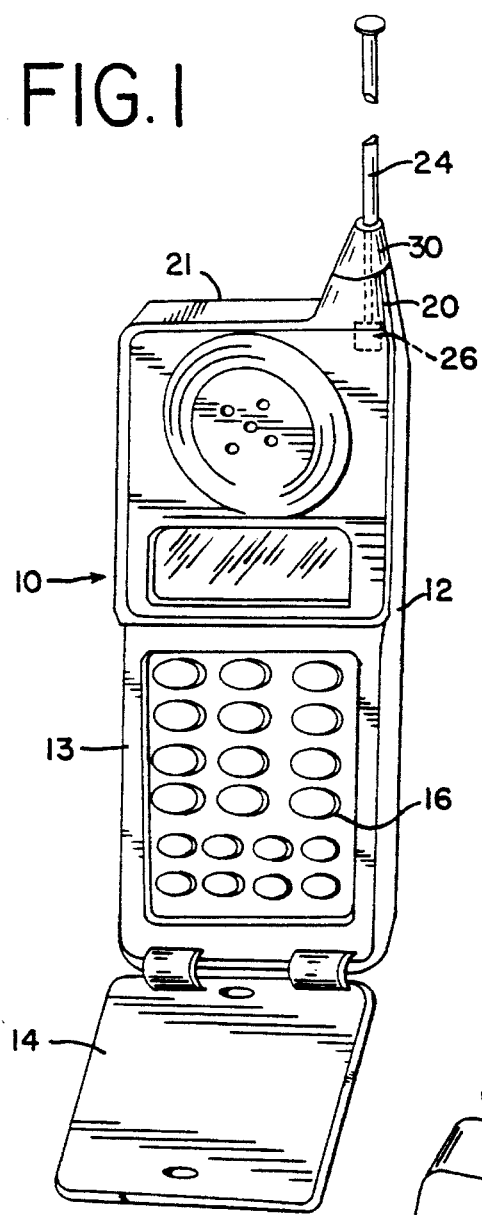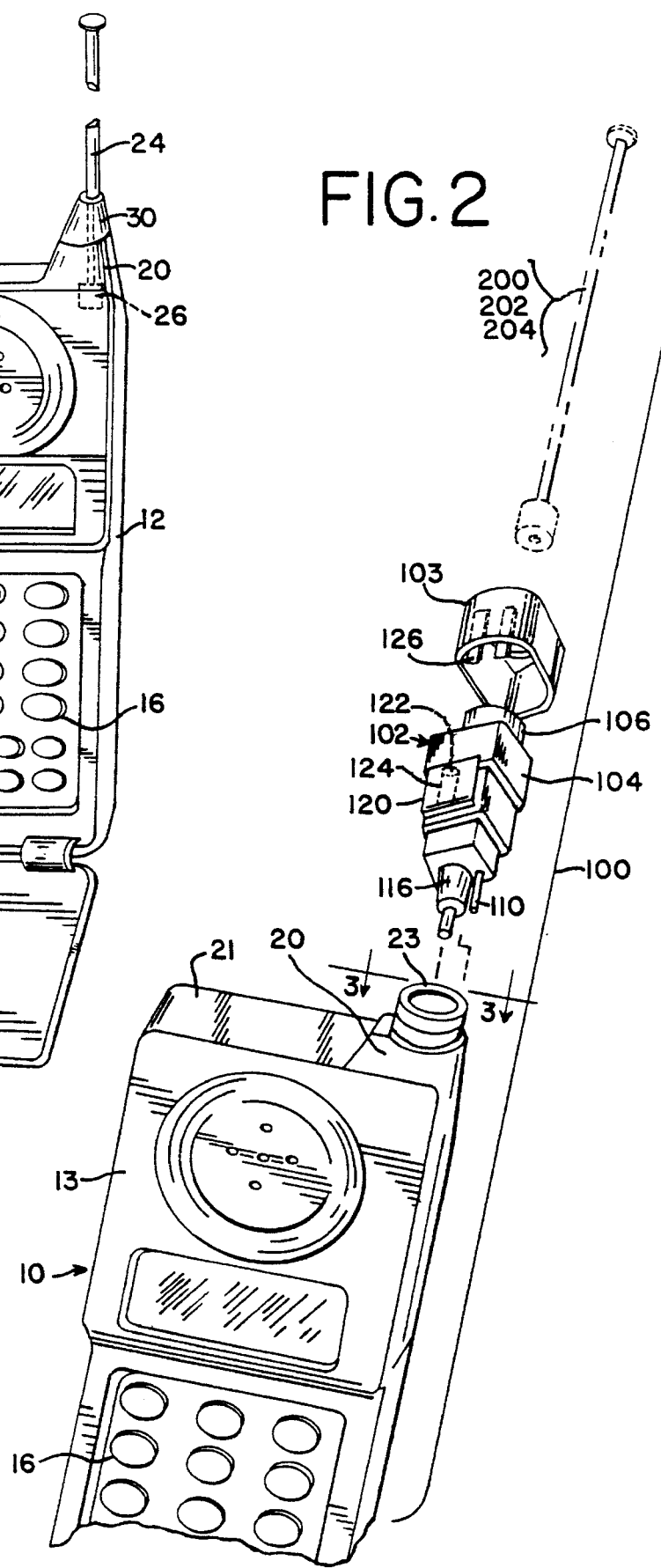

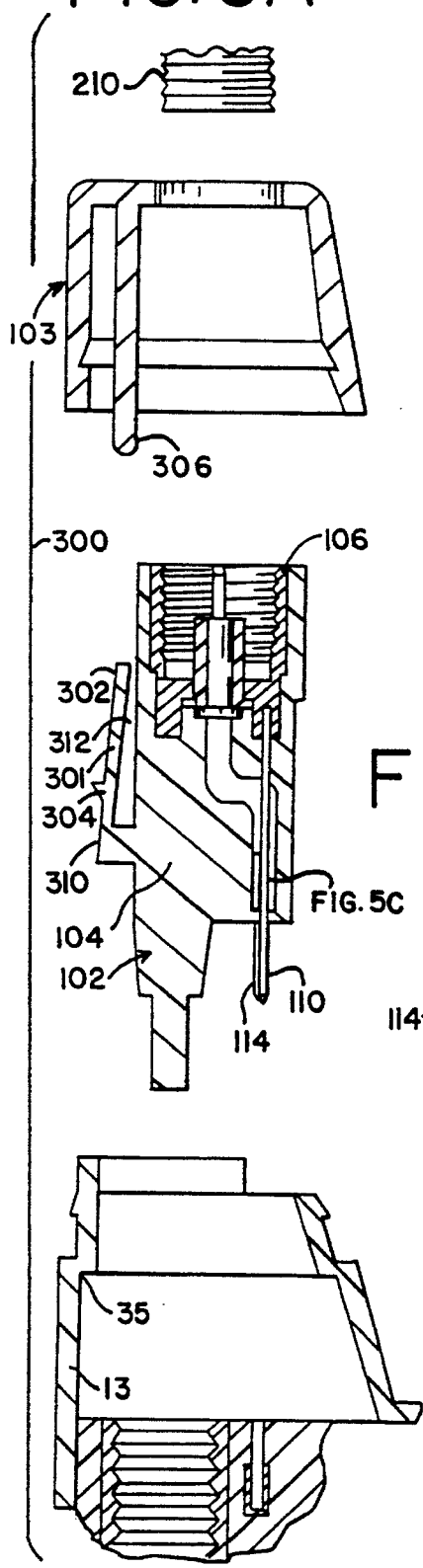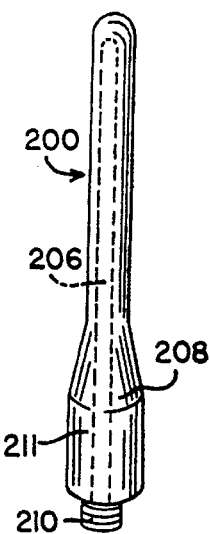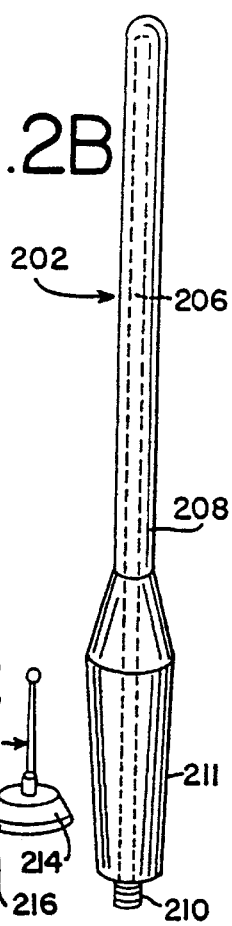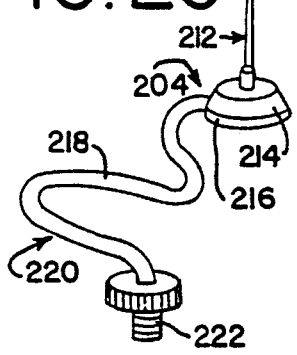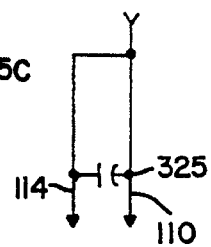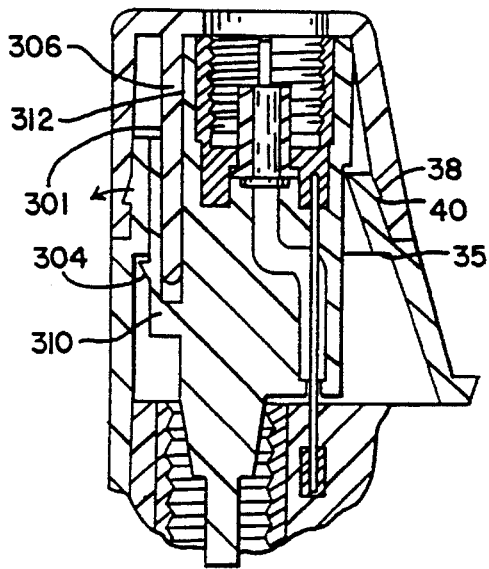

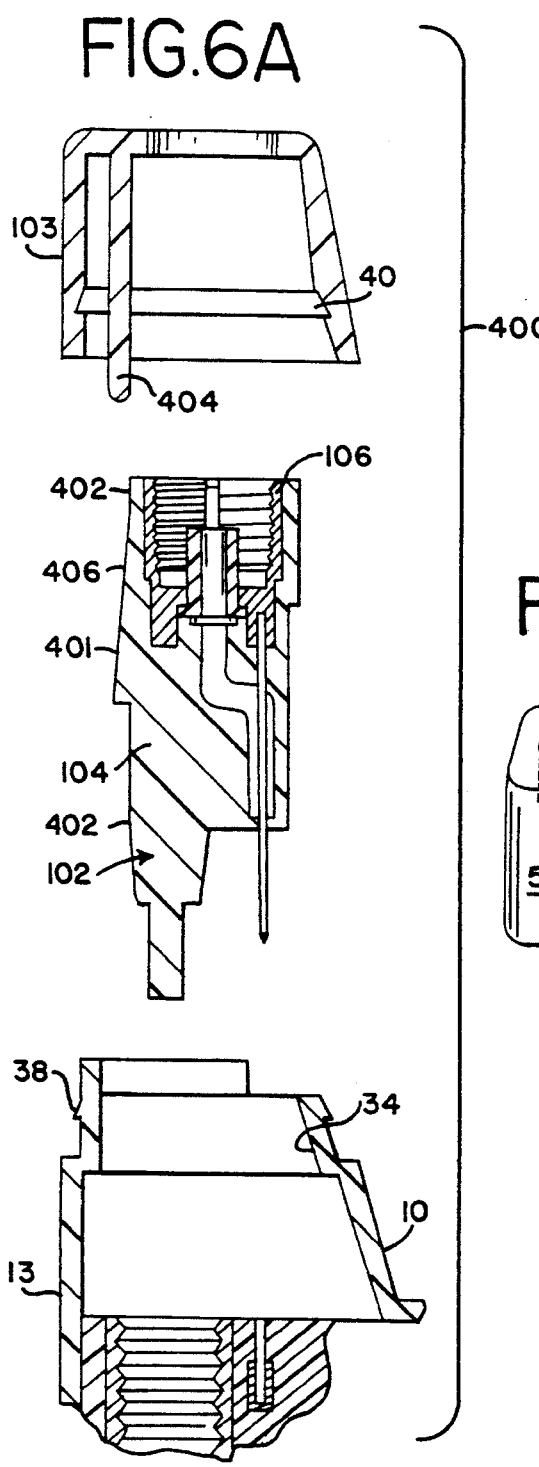
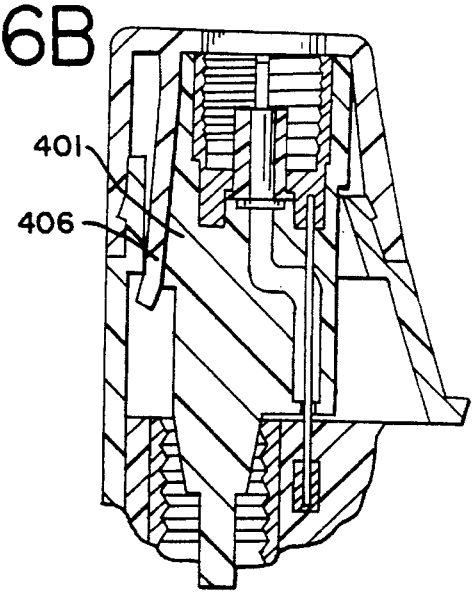
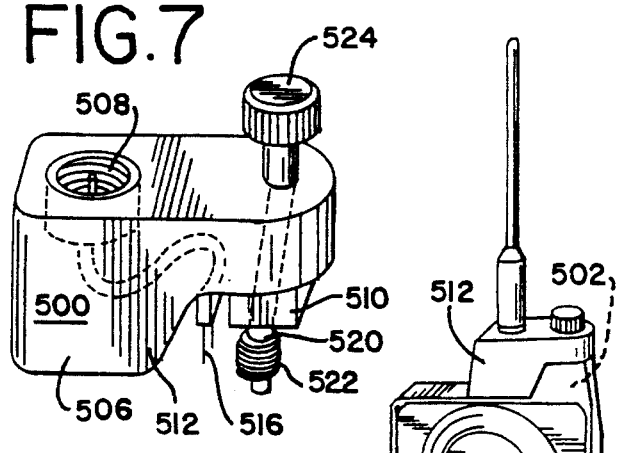
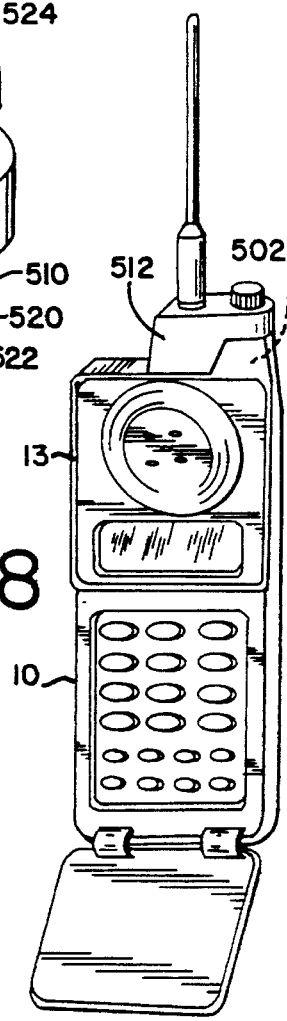

ANTENNA ADAPTER FOR PORTABLE CELLULAR TELEPHONE

BACKGROUND AND SUMMARY OF THE INVENTION

The present invention relates generally to portable cellular telephones, and more particularly, to an adapter assembly for a portable cellular telephone which permits the cellular telephone to receive a connection from either a replacement antenna or a direct feed connection from an external antenna.

The popularity of these personal communications devices, such as portable cellular telephones, has increased tremendously in the past few years and the technology utilized in them has attained such high levels that the size and price of these handheld cellular telephones has greatly diminished, thereby increasing their affordability. One popular model of a handheld portable cellular telephone is manufactured by Motorola, Inc. of Schaumburg, Ill. and sold under the trade name "Micro-Tac". It is commonly referred to as a "flip phone" by the public because it contains a component which is hinged to the telephone main body and "flips" away from the body and its associated key pad portion. This component may or may not include a microphone. In any event, the component flips away from the telephone body and opens to the user during operation.

The Micro-Tac telephone, as well as other portable telephones, are commonly produced by their original equipment manufacturer with an internal antenna already attached to the telephone. These antennas are typically either a collapsible design or a fixed spike design. Although some telephone manufacturers have provisions in their telephones in the form of alternate exterior connections to an external antenna device, the Micro-Tac telephone was not designed with any such direct feed connection for an external antenna.

Original equipment manufacturer ("OEM") antennas supplied with portable cellular telephones perform optimumly when the cellular telephone is used and operated in an open air environment. However, once the cellular telephone is moved inside of a building or a vehicle, the radio frequency (RF) energy which enables communications between the cellular telephone and the public telephone switching network is compromised to a large extent because the physical structure of the building or the vehicle presents interference to the antenna RF energy. RF energy has a very low penetration of metallic structures and substrates such as building columns or vehicle body panels. Because of this interference, portable cellular telephone users usually experience reduced RF performance when they operate their portable cellular telephones inside buildings or vehicles. A traditional cellular telephone which is mounted permanently in a vehicle does not encounter this type of interference because it has a direct feed connection to an exterior antenna mounted outside of the vehicle.

Recently, there has been a great concern over the possible detrimental effects of RF energy emanating from portable cellular telephone antennas which include increased risk of brain cancers and the like. Although no definitive links between these detrimental effects and RF energy emitted from handheld cellular telephone antennas, medical authorities are currently studying this matter and recommend as a safety precaution, that a cellular telephone user keep the antenna a distance from the user's head.

One way to overcome the above-described interference problem is to connect the portable cellular telephone to an external antenna by way of a direct feed connection which leads to an antenna radiating element mounted outside of the vehicle. This connection substantially improves the reception of the portable cellular telephone in the vehicle. The RF interference problem described above is also solved by an external antenna connection or replacement of the OEM antenna with either a more powerful antenna.

The use of a direct feed external antenna in a vehicle also complies with the medical recommendation to place the antenna far from the users's head. However, internal antenna connections of portable cellular telephones are often such that they cannot effectively and easily connect with either a replacement antenna element or a direct feed cable leading to an external antenna.

The present invention is therefore directed to an antenna adapter assembly which enables a user to easily utilize a direct feed antenna connection with a portable cellular telephone by engaging the telephone at a test port location disposed in the telephone body which accommodates the OEM antenna supplied with the telephone. The present invention provides advantages to a portable cellular telephone user in that it permits the user to easily replace the OEM antenna, should it become broken. The user may improve the performance of his telephone by substituting a replacement antenna with improved performance as compared to the OEM antenna. The user may also connect his portable cellular telephone to an external antenna by way of a direct feed connection. The adapter apparatus of the present invention replaces the existing antenna and easily permits a portable cellular telephone to utilize multiple designs and styles of antennas.

The present invention accomplishes these benefits and advantages by way of an adapter apparatus having a body portion which fits within the telephone housing through an opening in the telephone housing. The adapter body portion includes a projection which extends outwardly and engages a recess in the telephone body in order to position the adapter apparatus in a preselected registration within the telephone body. One or more electrical contact pins extend from the adapter body portion and engage electrical contact receptacles in the telephone body to provide a means of transmitting RF energy and signals from the replacement antenna or direct feed to the internal circuitry of the telephone.

In one embodiment of the present invention, the adapter body portion includes a flexible engagement tab extending from the body portion which is selectively moveable into and out of engagement with a portion of the telephone housing in response to the insertion of an antenna base cap which covers the antenna opening of the telephone body. The base cap includes one or more actuating members which engage the adapter body engagement tab and urge it into engagement with an interior surface of the telephone to thereby retain the adapter element in place within the telephone and maintain the adapter body portion in its connection with the telephone internal circuitry. A coaxial connector element is embedded in the adapter element and extends out through the base cap and provides a new point of operative connection for the portable telephone.

In another embodiment of the present invention, the adapter apparatus has a body component which partially extends into the telephone housing through a test port opening therein and also partially rests on an exterior surface of the telephone housing. Contact pins extend out from the adapter apparatus and enter the telephone housing via the test port thereof. A positioning lock is rotatably mounted within the adapter body component and includes a threaded engagement element which may be rotated by the user to effect the secure engagement of the adapter apparatus to the telephone body.

In other embodiments of the invention, the adapter body portion may be provided with one or more fixed protrusions which contact a depending member of the base cap to thereby urge the base cap member into engagement against a telephone housing sidewall of the telephone and retain the antenna adapter in place on the telephone.

Accordingly, it is a general object of the present invention to provide an apparatus for adapting a portable cellular "flip-phone" style telephone to receive a replacement antenna or external antenna direct feed connection.

Another object of the present invention is to provide an adapter assembly for a portable cellular telephone having an opening in a housing portion of the telephone which receives the adapter, the adapter including means for engaging the telephone and registering the adapter in place within the telephone housing portion, the adapter further having means for selectively engaging the telephone body housing whereby the engagement means may be urged into and out of engagement by an actuating member formed in the protective base cap which encloses the adapter and seals off the telephone housing opening.

It is a further object of the present invention to provide an antenna adapter assembly for a handheld cellular telephone which replaces the OEM antenna supplied with the telephones and adapts the telephone for use with an replacement antenna or external antenna, in which the antenna adapter assembly is held in place on the telephone body by selectively operable engagement means formed in the adapter assembly.

It is still another object of the present invention to provide an assembly for a portable cellular telephone of the "flip-phone" style which replaces the telephone OEM antenna and adapts the telephone for utilization of a replacement antenna or a direct feed connection from an external antenna, the assembly being adapted to fit within an opening of a telephone housing, the assembly including an adapter element having first means for engaging the telephone body and positioning the adapter member in place within the telephone housing opening, second means for establishing an electrical contact between the adapter element and the telephone body circuitry, and third means for selectively engaging the telephone housing to retain the adapter element in place within the telephone body housing, the assembly further including a protective base cap member which cooperates with the adapter element and which includes means for selectively actuating the adapter element engagement means.

These and other objects and features and advantages of the present invention will be clearly understood through consideration of the following detailed description.

BRIEF DESCRIPTION OF THE DRAWINGS

In the course of this detailed description, reference will be frequently made to the attached drawings in which:

FIG. 1 is a perspective view of a portable hand-held cellular telephone of the "flip-phone" style upon which the present invention is optimumly utilized;

FIG. 2 is a exploded view of an antenna adapter assembly constructed in accordance with the principles of the present invention with the adapter and base components rotated 90° from their normal position for purposes of clarity;

FIG. 2A is a view illustrating a quarter-wave spike replacement antenna which may be connected to the antenna adapter assembly of FIG. 2;

FIG. 2B is a view illustrating a half-wave spike replaced antenna which may be connected by the antenna adapter assembly of FIG. 2;

FIG. 2C is a view illustrating in an external antenna direct feed connection which may be connected to the antenna adapter assembly of FIG. 2;

FIG. 5A is an exploded view, in section, of a second embodiment of an antenna adapter assembly constructed in accordance with the principles of the present invention;

FIG. 5B is a sectional view of the antenna adapter assembly of FIG. 5A assembled together on the body of a portable cellular telephone;

FIG. 5C is a schematic view of the internal circuitry of the antenna adapter component of FIG. 5A;

FIG. 6A is an exploded view of a third embodiment of an antenna adapter assembly, shown in section;

FIG. 6B is a sectional view of the antenna adapter assembly of FIG. 6A assembled together onto a portable cellular telephone;

FIG. 7 is a perspective view of another embodiment of an antenna adapter assembly constructed in accordance with the principles of the present invention wherein a portion of the assembly engages the exterior of the telephone housing; and, FIG. 8 is a perspective view of the antenna adapter assembly of FIG. 7 assembled on to a portable cellular telephone.

DETAILED DESCRIPTION OF THE INVENTION

Figure 3:
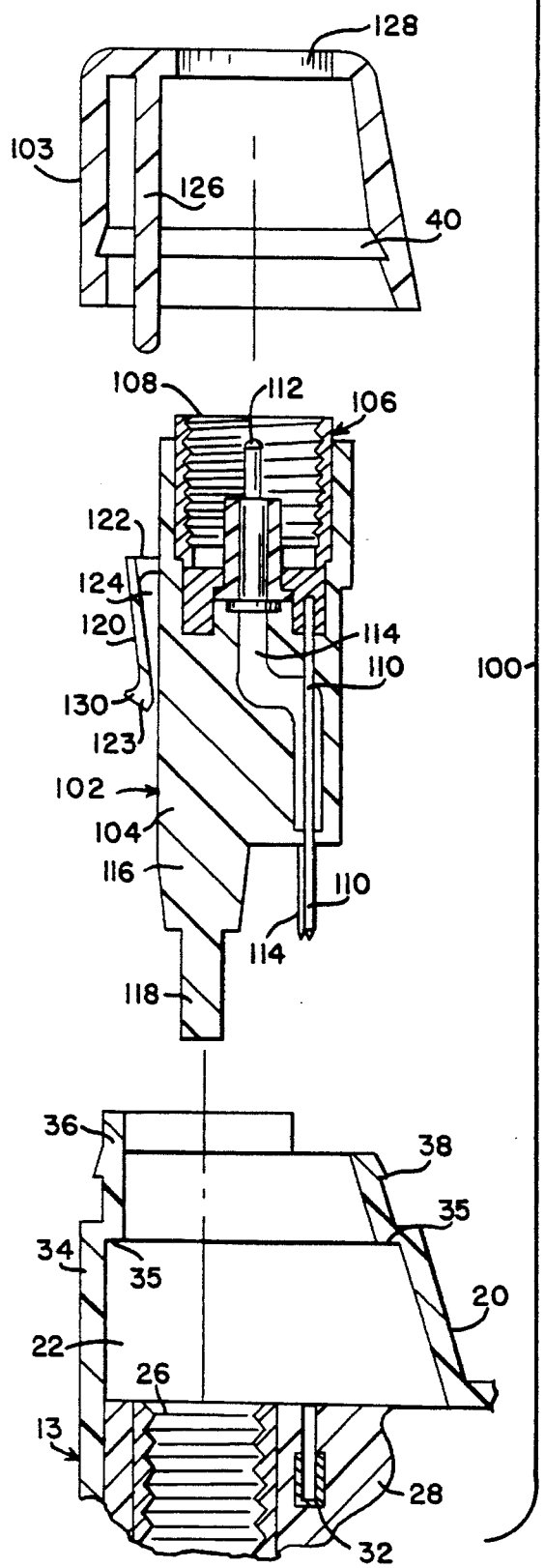
FIG. 3 is an enlarged exploded view, in section, of a portion of the telephone and antenna adapter assembly of FIG. 2 illustrating the alignment of the various components.

FIG. 1 illustrates a portable hand-held cellular telephone 10 illustrating or representing the preferred embodiment in which the present invention is used. The portable telephone 10 is of a "flip-phone" style such as is sold by Motorola, Inc. of Schaumburg, Ill. under the trade name "Micro-Tac". The telephone 10 has a body, or receiver component 12, which is enclosed in a plastic housing 13. A hinged component 14 may include a microphone and rotates away from the key pad portion 16 to allow the user to speak into the telephone, and hence the name "flip-phone". The internal circuitry and electrical components of the telephone 10, such as a circuit board, are contained within the telephone housing 13, and the housing has a projection 20 disposed along its top portion 21. The projection 20 encloses an antenna receptacle 22 that receives an antenna radiating element 24 through an opening 23 in the housing projection 20. The antenna radiating element 24 extends through this opening 23 and engages a threaded bore 26 in the chassis 28 of the telephone 10. The antenna radiating element 24 is sealed in the receptacle 22 by a protective base cap 30 which snaps onto the projection 20.

FIG. 2 illustrates an antenna adapter assembly 100 constructed in accordance with the principles of the present invention which includes an adapter component 102 and a retention component in the form of a base cap 103 which retains the adapter component 102 in place in the telephone 10. The adapter assembly 100 permits a user to replace the OEM radiating element 24 supplied with the telephone 10 with any suitable replacement antenna 200, 202 or 204.

Three typical replacement antennas 200, 202 & 204 are illustrated in FIGS. 2A–C. FIG. 2A depicts a quarter-wave spike antenna 200 and FIG. 2B depicts a half-wave spike antenna 202. Both of these antennas 200, 202 are of the "rubber duck" style in which the antenna conducting rod 206 of the antenna is covered with an exterior rubber protective coating 208. The spike antennas 200, 202 each contain a threaded coaxial connection 210 disposed at their base portion 211 which are received by the adapter component 102 in an electrically conductive relationship.

Another replacement antenna 204 is depicted in FIG. 2C in the form of an external antenna 212 that is supported by an external mounting assembly 214 which may either be permanently fixed to a vehicle or removeably fixed to a vehicle such as by a magnetic pad 216. The external antenna 212 includes a cable assembly 218 that extends from its mounting assembly 214 into the vehicle to provide a direct feed connection 220 which terminates in a connecting element 222.

Figure 4:
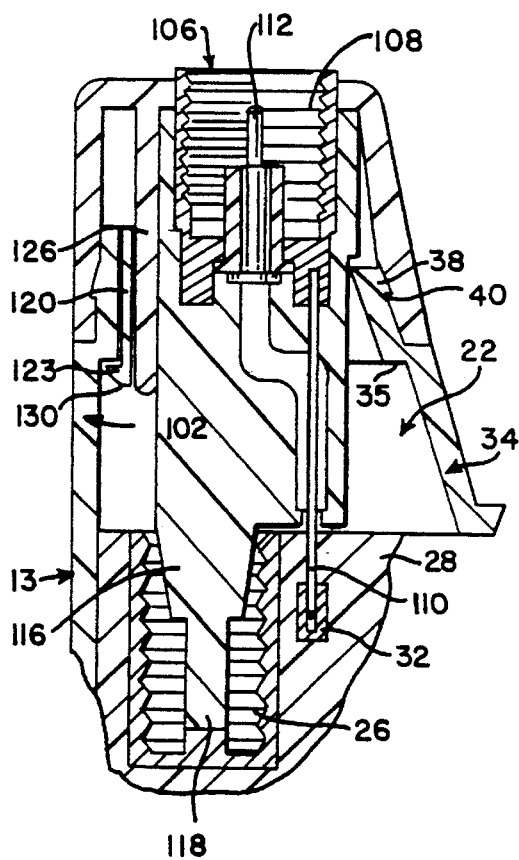
FIG. 4 is a sectional view of the components of FIG. 3 assembled together in place upon the portable telephone illustrating how the adapter assembly of the present invention engages the telephone.

Referring now to FIGS. 2–4, the antenna adapter element 102 includes a body portion 104 with a conductive insert 106. The conductive insert 106 includes a threaded recess 108 which forms the outer portion of a female antenna coaxial connection. The recess 108 includes an electrically conductive member extending therefrom, such as a first contact pin 110 extending through the adapter body portion 104 and out of the adapter element 102. The conductive insert 106 also includes a contact member 112 disposed in the center of the threaded recess 108. This contact pin 112 also terminates in an electrically conductive element, shown as a second contact pin 114, which extends through the adapter body portion 104 out of the base 105 thereof. These electrical components may be formed in the adapter body 104 most effectively by a suitable molding process.

The adapter body portion 104 is preferably molded from a non-conductive or insulative material, such as nylon or similar material, which has sufficient strength to retain the internal conductive insert 106 in place in the body portion 104, yet flexible enough to engage the telephone housing in the manner described below. The adapter body portion 104 includes a positioning element 116 that extends down from the base portion 105 thereof and terminates in a cylindrical lug 118. The positioning element 116 and associated lug 118 are dimensioned to be received in the telephone chassis 28 in registration with the chassis antenna bore 26. Preferably, the distance which the lug 118 extends from the adapter base portion 105 is generally equal to or slightly less than the depth of the telephone chassis antenna bore 26 so as to fix the positioning element 116 $i_N$ place within the telephone 10. Similarly, the positioning element 116 may have a diameter approximately equal to the antenna bore 26 to likewise fix the adapter element 102 in place. The electrical contact pins 110, 114 of the adapter element 102 are preferably disposed in the adapter body 104 in alignment with internally opposing contact receptacles and/or testing ports 32 located in the telephone chassis 28.

In an important aspect of the present invention, the adapter body 104 includes means for selectively engaging the telephone housing 13 to retain the adapter element 102 in place within the telephone 10. As illustrated in FIG. 2, this engagement means is illustrated as an engagement tab, or arm 120, which extends out from the adapter body portion 104 from a base member 122 formed integrally therewith so as to form a vertical cantilevered member having a free end 123. The adapter and base cap components 102 and 103 have been rotated approximately 90° in FIG. 2 for purposes of clarity to show the intended alignment of these two components. The manner of engagement of these two components 102, 103 with the telephone body 28 and housing 13 is shown in FIGS. 3 and 4, which are sectional views taken from the rear of the telephone as shown in FIG. 2. The base member 122 has a width which is less than that of the engagement arm 120 so that two actuating slots 124 are defined on opposing sides of the base member 122 in the space between the engagement tab 120 and adapter body 104. The cantilevered nature of the engagement tab 120 permits the free end 123 of the engagement arm 120 to selectively move away from the adapter body 104 in response to urging by an actuating member inserted into the slots 124.

The adapter assembly 100 includes a cooperating retention element, shown as a base cap 103 which replaces the OEM base cap 30 and seals off the telephone antenna receptacle 22. The base cap 103 includes a means for actuating the engagement tab 120 into a latching engagement with the telephone housing 11. In this regard, the base cap 103 preferably includes a pair of actuating members, shown in FIGS. 2–4 as lugs 126 formed in the base cap 103 proximate to an opening 128 therein which surrounds the threaded insert 106. These actuating members 126 extend downwardly and are preferably aligned with the engagement arm slots 124 formed in the engagement arm 120. The actuating members 126 extend into the slots 124 when the base cap 103 is operatively connected to the adapter element 102 and telephone housing 13 as shown in FIG. 4. When the actuating members 126 enter the slots 124, the free end 123 of the engagement arm 120 is urged outwardly away from the adapter body 104 into engagement with the telephone housing 13 to effectively "latch" the adapter element 102 in place within the telephone 10. This latching is accomplished by an engagement hook 130 which is formed in the engagement arm free end 123 and extends outwardly therefrom. The hook 130 is disposed opposite an internal shoulder 35 of the telephone housing sidewall 34.

The housing sidewall 34 may include an engagement ledge, or crown 38, formed in its exterior surface which engages a complimentary recess 40 of the base cap 103. This crown 38 and recess 40 cooperate to retain the base cap 103 in place upon the telephone housing 13 and maintain the base cap actuating members 126 in place within the engagement tab slots 124 so that the adapter component 102 remains engaged with the telephone housing 13.

FIGS. 5A and 5B illustrate a second embodiment 300 of an antenna adapter assembly constructed in accordance with the principles of the present invention. The overall structure of the adapter component 102 and base cap component 103 are generally the same for the following embodiments and the reference numbers used above in the embodiments of FIGS. 2–4 shall apply to this and other following embodiments, with the exception of the structure of the different engagement telephone housing mechanisms.

As illustrated in FIG. 5A, the adapter body engagement arm 301 extends in a vertically cantilevered manner up from its bottom portion so that the free end 302 of the engagement arm 307 is located at the top of the arm 301 rather than at the bottom. The engagement arm 301 has an outwardly extending catch member 304 located near its base portion 310. The catch 304 is urged outwardly and into contact with the telephone housing sidewall shoulder 35 when the base cap 103 is applied. In this embodiment, the base cap actuating member 306 comprises a single, solid tab of a width generally equal to that of the engagement arm 301 and which is inserted into a single slot 312 defined between the engagement arm 301 and the adapter body portion 104. This construction simplifies the forming of the base cap 103 by a suitable injection molding process.

As shown in FIGS. 5B and 5C, the adapter element 102 may include a capacitor interconnecting the contacts 110, 114 to match the impedance of the internal antenna circuitry of the telephone body 28. The capacitor 325 is a pico capacitor having a value of 1 picofarad which serves to establish the impedance of the antenna adapter assembly at a value matching that of the external antenna, such as 50 ohms. The capacitor 325 interconnects the two contacts 110, 114 within the adapter element body portion 104.

FIGS. 6A–6B illustrate a third embodiment 400 of the present invention wherein the adapter assembly engagement actuating means is formed in the adapter component 102 rather than in the base cap component 103. A ramp 401 is shown in FIGS. 6A–6B as extending out from the outer surface 402 of the adapter body 104 and defining a cam surface 406 thereon. The base cap members 404 are urged outwardly when they contact the ramp 401 and continue along the cam surface 406 thereof when the base cap 103 is fitted over the telephone 10 and adapter element 102. These members 404 thus engage the telephone housing sidewall 34 in an interference fit between the adapter element 102 ramp 401 and cam surface 406 and the opposing sidewalls 34 of the telephone housing 13, including the shoulder portions 35. This interference fit is sufficient to latch the adapter element 102 in place within the telephone and is assisted by the engagement which occurs between the housing sidewall crown 38 and the base cap recess 40.

Another embodiment 500 of the present invention is shown in FIGS. 7–8, wherein the adapter assembly 500 is substantially located outside of the telephone housing 13 and has a portion which partially extends into the telephone antenna receptacle 502. This adapter assembly 500 includes a body portion 506 having a replacement antenna direct feed connection receptacle 508 formed therein.

The adapter assembly 500 of this embodiment has a configuration which is adapted to fit the contour of the telephone. The adapter body 506 has an exterior portion 512 which contacts and rests on the telephone housing 13 and an internal portion 510 which extends into the receptacle 22 defined within the telephone housing projection 20. The internal portion 510 includes an extending base 514 which contains the necessary electrical contacts 516 to provide an electrical connection and further contains a telephone body engagement means shown as a threaded shaft 520 which extends entirely through the adapter body 506.

This shaft 520 has a threaded end portion 522 disposed on its lower end and an actuating portion, shown as a turning head 524, disposed thereon adjacent the top of the adapter body 506, by which a user may turn the head 524 to cause the shaft 520 to engage the telephone chassis antenna bore so that the adapter assembly 500 may be considered as an extension of the telephone housing 13 when installed. A suitable electrical connection extends between the contact pins 516 and the adapter connection receptacle 508 within the adapter body 506.

It will be seen that while certain embodiments of the present invention have been shown and described, it will be obvious to those skilled in the art that changes and modifications may be made therein without departing from the true spirit and scope of the invention.

We claim:

1. An apparatus for adapting a portable cellular telephone for use with a replacement antenna other than the antenna supplied with the cellular telephone by its original manufacturer, wherein said cellular telephone includes a chassis enclosed inside of a housing, the housing having an opening disposed therein proximate to an antenna-receiving receptacle present in said telephone chassis, the apparatus comprising:

an adapter element having a body portion, a bore disposed in the adapter element body portion defining a point of connection for the replacement antenna, a registration member extending from said adapter element body portion for positioning the adapter element in place in a preselected position within said housing, the registration member engaging said telephone chassis antenna-receiving receptacle, at least one contact member extending out of said adapter element body portion for establishing electrical connection between said adapter element bore and antenna circuitry present in said telephone chassis, the contact member being received by a contact receptacle of said telephone chassis, and an engagement member for selectively engaging said housing in a manner to retain said adapter element in place within said housing and in connection with said telephone chassis; and, a cap element which engages said housing and closes off said housing opening when the cap element is operatively connected to said housing and which actuates said adapter element engagement member when said cap element is operatively connected to said adapter element, said cap element including means for actuating said adapter element engagement member into an engagement position wherein said adapter element engagement member engages a surface of said housing, said cap element actuating means including at least one elongated actuating lug which extends from said cap element in alignment with said adapter element engagement member, whereby when said cap element is operatively connected to said housing and said adapter element, the actuating lug contacts said adapter element engagement member and urges said adapter element engagement member into said engagement position.

2. The apparatus of claim 1, wherein said adapter element contact member includes an electrical contact pin extending from said adapter element body portion, said adapter element engagement member includes a cantilevered arm extending from said adapter element body portion, and said base cap adapter element engagement member actuating means including a pair of elongated actuating members that depend from said cap element and are received in a slot defined between said cantilevered arm and said adapter element body portion, whereby said cap element actuating members exert a biasing force upon said cantilevered arm when inserted into said slot to move said cantilevered arm outwardly into contact with said housing surface when said cap element is operatively connected to said housing and said adapter element.

3. The apparatus of claim 2, wherein said cantilevered arm extends vertically from said adapter element body portion and has a free end disposed at a lower end thereof, the free end having a latch member opposing said housing surface, the latch member being urged into engagement with said housing engagement surface when said cap element actuating members enter said slot.

4. The apparatus of claim 2, wherein said housing surface includes a shoulder formed in a sidewall of said telephone housing, the shoulder being disposed generally transversely to an axis of said adapter element.

5. The apparatus of claim 2, wherein said cantilevered arm extends vertically from said adapter element body portion and has a free end disposed at an upper end thereof, the cantilevered arm further having a catch element disposed away from said free end and extending outwardly therefrom and away from said adapter element body portion, said catch element being urged into engagement with a shoulder formed in a sidewall of said housing when said cap element actuating member enters said slot.

6. An antenna adapter assembly for a portable cellular telephone of the type having an internal circuit board enclosed in a housing, the circuit board including an antenna connection port formed therein and disposed within said housing in proximity to an opening in said housing, the adapter assembly comprising: an adapter element and a locking element, the adapter element including a body member having an antenna-receiving receptacle disposed in one end thereof and a circuit board engagement member formed in a opposite end thereof, the circuit board engagement member being received within the circuit board antenna connection port when said adapter assembly is operatively connected to said telephone, the adapter element further having means for establishing an electrical connection between said circuit board and said adapter element antenna-receiving receptacle, said adapter element further including a latch member operable between first and second operative positions in response to connection of said locking element to said housing and to said adapter element, said latch member occupying the first operative position when said locking element is not connected to said adapter element and said housing, said latch member occupying the second operative position when said locking element is operatively connected to said adapter element and said housing, said latch member having a free end which is spaced away from an engagement surface of said housing in said first operative position and is engaged with said housing engagement surface in said second operative position, said locking element including an actuating member which engages said adapter element latch member and urges said latch member from said first operative position into said second operative position when said locking element is operatively connected to said adapter element and said housing.

7. The antenna adapter assembly of claim 6, wherein said adapter element antenna-receiving receptacle includes a female coaxial connection having a threaded bore and said adapter element further includes capacitor means disposed within said adapter element for matching impedance of circuits exterior to said adapter element.

8. The antenna adapter assembly of claim 6, wherein said latch member includes a cantilevered engagement arm which is spaced apart from said adapter element body portion by a predetermined spacing and said locking element actuating member includes at least one lug having a thickness which is greater that said predetermined spacing, whereby when said locking element actuating lug is inserted into the space between said adapter element body portion and said engagement arm, said engagement arm moves outwardly away from said adapter element body portion to engage said housing.

9. The antenna adapter assembly of claim 6, wherein said free end is disposed on a lower end of a cantilevered engagement arm.

10. An apparatus for a hand-held cellular telephone which permits a user of the telephone to replace the antenna supplied with said telephone by the original telephone equipment manufacturer with a replacement antenna of the user's choice, wherein said telephone includes a body portion having an antenna-receiving bore therein, a housing partially enclosing said body portion and said antenna-receiving bore, the telephone housing including an opening in general alignment with said antenna-receiving bore, said apparatus comprising:

an adapter element having first means for engaging said telephone body portion antenna-receiving bore and positioning the adapter element in registration within said telephone housing, second means for establishing an electrical connection between said adapter element and antenna circuitry resident in said telephone body portion, third means for receiving a connective end of the replacement antenna, the adapter element second and third means being conductively interconnected within said adapter element, fourth means for selectively engaging said telephone housing, the adapter element fourth means including a cam surface which opposes a shoulder portion of said telephone housing; and, a retention element having first means for actuating said adapter element cam surface into engagement with said telephone housing shoulder portion, the retention element first means including an engagement member which contacts said cam surface to urge said cam surface into engagement with said telephone housing shoulder portion when said retention element is operatively connected to said telephone housing, and second means for engaging said telephone housing and retaining said retention element in place on said telephone housing, said retention element second means further maintaining the retention element first means in an actuating mode, whereby said adapter element fourth means engages with said telephone housing.

11. The apparatus of claim 10, wherein said adapter element fourth means includes a cantilevered arm extending from said adapter element, the cantilevered arm having a free end which is moveable between first and second operative positions, wherein in the first operative position, the free end opposes a shoulder of said telephone housing and wherein in the second operative position, said free end is urged by said retention element first means into engagement with said telephone housing shoulder when said retention element is placed upon said telephone housing.

12. The apparatus of claim 11, wherein said cantilevered arm is vertically cantilevered and said free end includes a latch member disposed on said free end at a lower end of said cantilevered arm, said cantilevered arm extending generally parallel to an axis of said adapter element, said arm further including a base member which spaces said cantilevered arm away from said adapter element and defines at least one slot between said arm cantilevered and said adapter element, said retention element first means extending into said slot and biasing said latch member into engagement with said telephone housing shoulder.

13. The apparatus of claim 12, wherein said retention element includes a base cap and said retention element first means includes two elongated lugs which depend from said base cap.

14. The apparatus of claim 10, wherein said retention element includes a base cap member, the base cap member having an opening which is aligned with said adapter element third means and which engages said adapter element third means when said retention element is operatively connected to said telephone housing.

15. The apparatus of claim 14, wherein said base cap member includes a sidewall surrounding said opening, and said retention element second means includes an engagement recess disposed on an interior surface of the sidewall which engages an engagement surface of said telephone housing.

16. The apparatus of claim 11, wherein said cantilevered arm extends vertically along said adapter element and said free end is disposed at an upper portion of said cantilevered arm, said cantilevered arm being further spaced away from said adapter element to define at least one slot between said cantilevered arm and said adapter element, the cantilevered arm slot receiving said retention element first means therein, whereby said retention element first means urges said cantilevered arm free end outwardly away from said adapter element into engagement with said telephone housing shoulder.

17. The apparatus of claim 16, wherein said cantilevered arm includes an latch member disposed thereon away from said cantilevered arm free end.

18. The apparatus of claim 17, wherein said latch member is disposed on said cantilevered arm opposing said telephone housing shoulder.

19. The apparatus of claim 10, wherein said adapter element first means includes a post member which is received by said telephone body portion antenna-receiving bore.

20. The apparatus of claim 11, wherein said cantilevered arm is supported by a base member which defines two slots between said cantilevered arm and said adapter element, and said retention element first means includes a pair of elongated actuating lugs which are received by said slots.

21. The apparatus of claim 11, wherein said cantilevered arm is spaced apart from said adapter element by a base member which defines a slot therebetween and said retention element first means includes an elongated actuating lug having a thickness greater than a depth of said slot.

22. The apparatus of claim 21, wherein the actuating lug has a width which approximates a width of said cantilevered slot.

23. The apparatus of claim 10, wherein said element fourth means includes a cam surface which opposes a retention element first means engagement member includes an elongated member which contacts said cam surface and is urged outwardly into engagement with said telephone housing shoulder when said retention element is operatively connected to said telephone housing.

24. An adapter assembly for providing an external antenna connection to a handheld cellular telephone which has a telephone body portion enclosed within an exterior housing, the telephone body portion including an antenna-receiving bore and internal antenna circuitry, the assembly apparatus comprising:

an adapter body having an antenna-receiving receptacle formed therein, the adapter body including at least one electrical contact member extending therefrom and electrically connected to the antenna-receiving receptacle, said adapter body further having means for engaging said telephone body portion within said antenna-receiving bore and means for actuating said telephone body portion engagement means, said adapter body electrical contact member and telephone body engagement means being disposed in a first base portion of said adapter body which extends into said telephone housing proximate to, but offset from said telephone body antenna-receiving bore, said adapter body further including a second base portion which is offset from said first base portion and which engages an outer surface of said telephone housing, whereby said external antenna connection is offset from said telephone body portion antenna-receiving bore.

25. The assembly of claim 24, wherein said telephone body portion engagement means includes a rotatable member having a threaded engagement portion on an end thereof which opposes said telephone body antenna-receiving bore.

26. The assembly of claim 25, wherein said rotatable engagement member includes an enlarged head portion disposed exterior of said adapter body which permits a user to rotate said rotatable engagement member.

27. The assembly of claim 24, wherein said adapter body has a contoured surface which matches an exterior surface of said telephone housing.

28. An apparatus for a hand-held cellular telephone which permits a user of the telephone to replace the antenna supplied with said telephone by the original telephone equipment manufacturer with a replacement antenna of the user's choice, wherein said telephone includes a body portion having an antenna-receiving bore therein, a housing partially enclosing said body portion and said antenna-receiving bore, the telephone housing including an opening in general alignment with said antenna-receiving bore, said apparatus comprising:

an adapter element having first means for engaging said telephone body portion antenna-receiving bore and positioning the adapter element in registration within said telephone housing, second means for establishing an electrical connection between said adapter element and antenna circuitry resident in said telephone body portion, third means for receiving a connective end of the replacement antenna, the adapter element second and third means being conductively interconnected within said adapter element, fourth means for selectively engaging said telephone housing; and, a retention element including a cap member, the cap member including an opening which is aligned with said adapter element third means and which engages said adapter element third means when said retention element is operatively connected to said telephone housing, said cap member further having first means for actuating said adapter element fourth means into engagement with said telephone housing and second means for engaging said telephone housing and retaining said retention element in place on said telephone housing, said retention element second means further maintaining the retention element first means in an actuating mode, whereby said adapter element fourth means engages with said telephone housing.

29. An adapter for adapting a portable cellular telephone for use with a replacement antenna other than the antenna supplied with the telephone by its original manufacturer by providing a direct feed connection to said telephone, wherein said telephone includes telephone circuitry disposed within a housing of said telephone, the housing having an opening disposed therein proximate to an antenna connection present in said telephone circuitry, the adapter comprising:

an adapter body, means disposed on the adapter body defining a point of connection for the replacement antenna, means extending out of said adapter body for electrically connecting said adapter body to said telephone circuitry, means extending from said adapter body for positioning said adapter body in a preselected position within said housing, and engagement means for selectively engaging said housing in a manner to retain said adapter body in place within said housing and said adapter body in electrical connection with said telephone circuitry; and, a retention element which operatively connects to said adapter body and which actuates said engagement means when said retention element is engaged with said adapter body, said retention element including at least one actuating member for actuating said engagement means into an engagement position wherein said engagement means engages a surface of said telephone housing, the actuating member extending from said retention element in alignment with said engagement means, whereby when said retention element is operatively connected to said adapter body, said actuating member contacts said engagement means and urges said engagement means into said engagement position.

* * * * *